Aug. 28, 1951    J. L. HAYCOCK    2,565,814
SAW BLADE STRUCTURE
Filed Oct. 31, 1949

Joseph L. Haycock
INVENTOR.

BY Alex. E. MacRae
Attorney.

Patented Aug. 28, 1951

2,565,814

UNITED STATES PATENT OFFICE 2,565,814

SAW BLADE STRUCTURE

Joseph L. Haycock, Napanee, Ontario, Canada

Application October 31, 1949, Serial No. 124,559
In Canada December 6, 1948

3 Claims. (Cl. 143—133)

This invention relates to saws, and more particularly to the tooth structure thereof.

An object of the invention is to provide a saw having teeth of simple structure and which may be employed for both cross-cutting and ripping, which will result in the provision of an exceptionally true and smooth face on the surface produced on the material by sawing, and which is subject to inexpensive and convenient manufacture.

Figure 1:
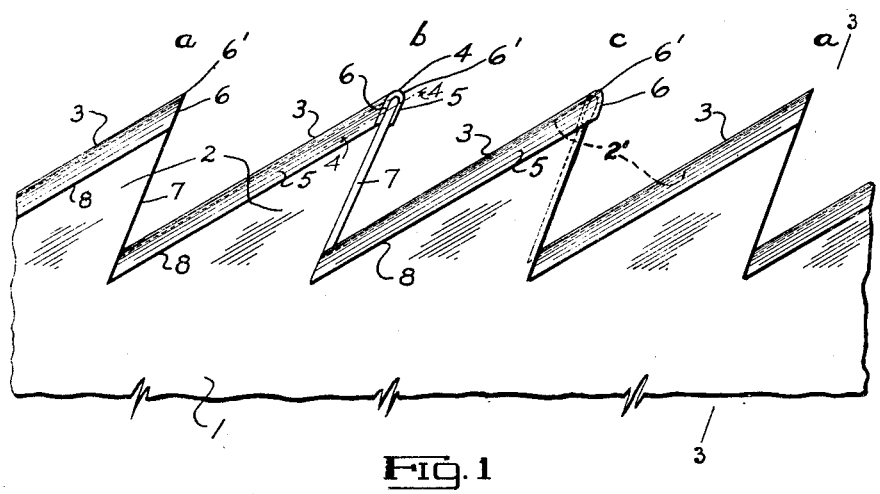
Figure 2:
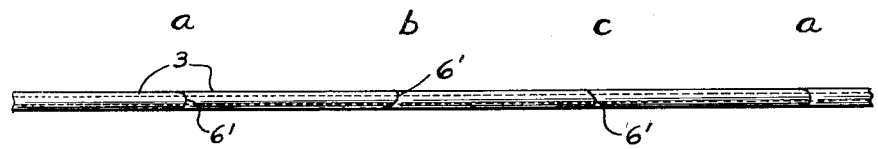
Figure 3:
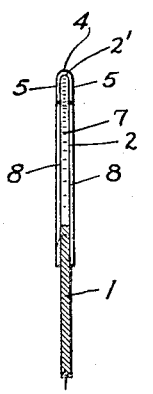
Figure 4:
Figure 5:
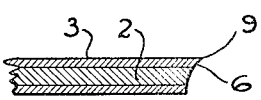

The invention will be described with reference to the accompanying drawing, in which Figure 1 is a partial side elevation of the toothed portion of a saw in accordance with the invention, Figure 2 is a plan view, Figure 3 is a sectional end elevation, Figure 4 is a view on line 4—4 of Figure 1, and Figure 5 is a view similar to Figure 4 but showing a slightly modified form of cutting face.

In the drawing, I is a saw blade, which may be of the circular, band, hand, or chain saw type. The saw blade is provided with a plurality of tooth members 2, of conventional configuration, which may be integrally formed with the blade. However, such tooth members lie in the same plane as the blade throughout their extent and are free from integrally formed cutting faces. Fixed to the outer inclined edge portion 2' of each member 2, as by welding, brazing, soldering, or the like, is a channel member or bar 3. As shown, the web portion 4 of the bar is of substantially semi-circular configuration and engages the edge of tooth 2, while the side portions 5 of the bar 3 engage opposed side faces of the edge portion of the tooth. Each bar 3 extends substantially throughout the length of edge portion 2', the end edge 6 terminating substantially in the same plane as the inclined end edge 7 of the tooth 2. The upper portion of the end edge of bar 3 thus becomes the leading edge of the saw tooth and, in accordance with the invention, such leading edge is sharpened to provide arcuate cutting edges 6' thereon.

Each bar 3 is of uniform cross-section throughout its length and the axis thereof coincides with the medial plane of the blade I, whereby all the bars lie in the same vertical plane. As shown, the lower edges 8 of each bar constitute the inclined shoulders extending along the side faces of each tooth 2.

The ends 6 of the bars 3, with the cutting edges 6', thus constitute the teeth proper of the saw in accordance with the invention.

The transverse angle or plane of the cutting face 6' will vary greatly in practice and will depend upon the character and function of the saw to be produced. Moreover, each saw may comprise a plurality of successive series of teeth, wherein each series consists of a number of teeth, each of varying transverse plane. Figures 1 and 2 illustrate one such series, by way of example, consisting of three teeth a, b, and c. As shown, the transverse plane of tooth a is normal to the plane of the saw blade, that of tooth b angularly to the plane of the saw blade whereby its cutting or leading edge is adjacent one side of the blade, and that of tooth c angularly to the plane of the saw blade whereby its cutting or leading edge is adjacent the other side of the blade. Such a saw is suitable for cross-cutting, the angularly arranged teeth scoring the material to be cut and the right angle tooth cutting away the scored material.

The laterally extending shoulders 8 on each tooth, will act as raking means for the saw.

Since the bars 3 lie in the same plane, i. e., do not have portions extending angularly thereof, as in the case of ordinary saws having "set" teeth, there is no sidewise cutting effect and no tendency of the saw to "wander" during the cutting operation. Thus, the cut produced is extremely true and has a very smooth surface.

The channel bars 3 are susceptible of exceptionally strong attachment to the blade and, since stresses imposed thereon are transmitted directly to the blade, dislodgment thereof is substantially impossible.

While the end edges 6 may be flat as indicated in Figure 4, the bars 3 may have honed concave end faces 9, as shown in Figure 5, to provide a sharpened leading edge 9'.

What is claimed is:

1. A saw comprising a blade having a plurality of tooth members along an edge thereof, each tooth member presenting an outer inclined edge of major length and an inner inclined edge of minor length, said inner inclined edges being exposed, and a channel-shaped bar fixed to each said outer inclined edge with its web engaging said last mentioned edge and its opposed sides embracing the adjacent side faces of the tooth, the end of the web of each bar projecting forwardly beyond said inner inclined edge and constituting the leading edge of the tooth member, said end of the web having a cutting edge thereon, the axes of all of said bars coinciding with the medial plane of the blade, and said bars being of substantially uniform cross-section throughout.

2. A saw as defined in claim 1, wherein said bar is substantially coextensive in length with said inclined edge.

3. A saw comprising a blade having a plurality of tooth members along an edge thereof, each tooth member presenting an outer inclined edge, and a channel-shaped bar fixed to said inclined edge with its web engaging said edge and its opposed sides embracing the adjacent side faces of the tooth, the end of said bar constituting the leading edge of the tooth member and having a cutting edge thereon, the axes of all of said bars coinciding with the medial plane of the blade, said bars being arranged in successive series of at least three, one bar of each series having its said end arranged in a plane normal to the plane of the blade, another bar of said series having its said end angularly arranged with its leading edge on one side of the plane of the blade, and another bar of said series having its said end angularly arranged with its leading edge on the other side of the plane of the blade.

JOSEPH L. HAYCOCK.

REFERENCES CITED

The following references are of record in the file of this patent:

UNITED STATES PATENTS

| Number | Name | Date |
| --- | --- | --- |
| 192,090 | Spaulding | June 19, 1877 |
| 241,082 | Snyder | May 3, 1881 |
| 341,789 | Becker | May 11, 1886 |
| 347,008 | Proctor | Aug. 10, 1886 |